(12) United States Patent
DuLeone et al.

(10) Patent No.: US 10,121,170 B2
(45) Date of Patent: Nov. 6, 2018

(54) SYSTEM AND METHOD FOR MINIMIZING A PHYSICAL QUEUE

(71) Applicant: NBCUniversal Media, LLC, New York, NY (US)

(72) Inventors: Matt DuLeone, Emerson, NJ (US); Azfar Inayatullah, Princeton Junction, NJ (US)

(73) Assignee: NBCUniversal Media, LLC, New York, NY (US)

( * ) Notice: Subject to any disclaimer, the term of this patent is extended or adjusted under 35 U.S.C. 154(b) by 854 days.

(21) Appl. No.: 14/575,936

(22) Filed: Dec. 18, 2014

(65) Prior Publication Data

US 2016/0180412 A1 Jun. 23, 2016

(51) Int. Cl.
*G06Q 30/02* (2012.01)

(52) U.S. Cl.
CPC .................. *G06Q 30/0281* (2013.01)

(58) Field of Classification Search
CPC .................................. G06Q 30/0281
See application file for complete search history.

(56) References Cited

U.S. PATENT DOCUMENTS

| | | | | |
|---|---|---|---|---|
| 6,173,209 B1 * | 1/2001 | Laval | ..................... | G06Q 10/02 235/382 |
| 2002/0007292 A1 * | 1/2002 | Paxton | .................. | G06Q 10/02 705/6 |
| 2004/0225540 A1 * | 11/2004 | Waytena | ................ | G06Q 10/02 705/5 |
| 2009/0313062 A1 * | 12/2009 | Natsuyama | ............ | G06Q 10/02 705/5 |
| 2010/0277276 A1 * | 11/2010 | Bayne | ................. | G07C 9/00111 340/5.21 |
| 2011/0307547 A1 * | 12/2011 | Backer | ................... | G06Q 10/02 709/203 |
| 2013/0332509 A1 * | 12/2013 | Schwartz | ............... | G07C 11/00 709/203 |
| 2014/0074404 A1 * | 3/2014 | Hassan | ................ | G01C 21/343 701/540 |
| 2015/0193997 A1 * | 7/2015 | Butler | ................... | G07C 11/00 340/5.6 |
| 2016/0055429 A1 * | 2/2016 | Schwartz | ............... | G06Q 10/02 705/5 |

* cited by examiner

*Primary Examiner* — Sujay Koneru
(74) *Attorney, Agent, or Firm* — Lee, Hong, Degerman, Kang & Waimey PC (57) ABSTRACT

A method for minimizing a physical queue for a first guest attraction, the method including storing a guest identifier corresponding to a guest in a first virtual queue, wherein a position of the guest within the first virtual queue is associated with an estimated wait time for the first guest attraction, updating the first virtual queue when the position of the guest within the first virtual queue is changed, providing a notification to the guest to enter the physical queue when the position of the guest in the first virtual queue is less than or equal to a threshold position of the first virtual queue, removing the guest identifier from the first virtual queue in response to an indication to dequeue the guest from the first virtual queue, storing the guest identifier in a second virtual queue corresponding to the physical queue, and removing the guest identifier from the second virtual queue in response to an indication that the guest is exiting the physical queue.

31 Claims, 3 Drawing Sheets

SYSTEM AND METHOD FOR MINIMIZING A PHYSICAL QUEUE

Long physical queues for attractions at entertainment venues are cumbersome, prevent guests from maximizing their time at the venue, and take up valuable space that could otherwise be used for guest amusement. A large portion of a guest's time at a venue may be spent simply waiting in physical queues for attractions, and the time spent actually enjoying the attraction may be significantly disproportionate to the time waiting in queue to reach the attraction, thereby reducing the guest's overall experience of the attraction.

Traditional attempts at removing the physical queue, including issuing numbered tickets or pagers, are inefficient as they fail to consider other factors including other attractions of the venue, activities of the guest, or the venue as a whole. The ability for a venue to manage a queue for an attraction by removing the hassle of a guest to physically wait in a queue, while dynamically considering other attractions, activities of the guest, and conditions of the venue as a whole may be advantageous. Thus, there is a great need for a solution to effectively manage an attraction queue for a venue to maximize guest enjoyment.

SUMMARY

Embodiments of the present disclosure include a system and method for minimizing a physical queue for a guest attraction, wherein a guest is placed in a first virtual queue, a threshold position for notifying the guest to enter a physical queue is determined, and the threshold position is dynamically updated. Certain embodiments include placing the guest in a second virtual queue when the guest enters a physical queue for the attraction.

Embodiments of the present disclosure include dynamically obtaining location information of a guest relative to the physical queue, dynamically obtaining queue information of other attractions within the venue, and determining a threshold position for notifying the guest based on all obtained information.

According to an embodiment, a method of the present disclosure includes storing a guest identifier corresponding to a guest in a first virtual queue, wherein a position of the guest within the first virtual queue is associated with an estimated wait time for the first guest attraction, updating the first virtual queue when the position of the guest within the first virtual queue is changed, providing a notification to the guest to enter the physical queue when the position of the guest is less than or equal to a threshold position, removing the guest identifier from the first virtual queue in response to information indicating a presence of the guest in the physical queue, storing the guest identifier in a second virtual queue corresponding to the physical queue, and removing the guest identifier from the second virtual queue when the guest is no longer present in the physical queue According to another embodiment, a system of the present disclosure includes a memory, a communication interface, and at least one controller, wherein the controller is configured to cause the memory to store a guest identifier corresponding to a guest in a first virtual queue, wherein a position of the guest within the first virtual queue is associated with an estimated wait time for the first guest attraction, update the first virtual queue when the position of the guest within the first virtual queue is changed, cause the communication interface to transmit a notification to the guest to enter the physical queue when the position of the guest is less than or equal to a threshold position, cause the memory to remove the guest identifier from the first virtual queue in response to information indicating a presence of the guest in the physical queue, cause the memory to store the guest identifier in a second virtual queue corresponding to the physical queue, and cause the memory to remove the guest identifier from the second virtual queue when the guest is no longer present in the physical queue.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for minimizing a physical queue for an attraction at a venue, wherein guest information is stored in a first virtual queue and a threshold position in the first virtual queue is dynamically determined for providing a notification to the guest to enter a physical queue based on a location of the guest, the guest's interactions with other attractions, and conditions of the venue.

Figure 1:
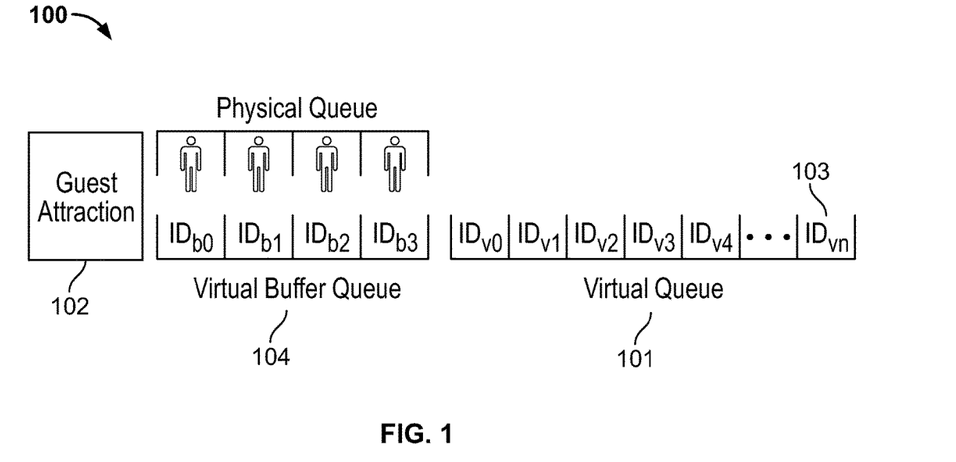
FIG. 1 is an illustration of a physical queue, virtual buffer queue, and virtual queue for a guest attraction according to an embodiment of the present invention.

Referring now to FIG. 1, an implementation of a physical queue 100 and a virtual queue 101 for a guest attraction 102 is depicted. As mentioned physical queues have the disadvantage that guests are required to physically be present in the queue in order to hold the guest's place in the queue order, and to eventually reach the start of the queue, hereinafter referred to as the entrance of the attraction. It will be understood by those of ordinary skill in the art that the present disclosure may be applied to a wide variety of situations in which groups or individuals wait in a queue. Examples of such situations include a wide variety of attractions including amusement park rides, movies, shows, concession stands, shopping centers, tourist attractions, landmarks, and the like. Thus, it will be further understood that the entrance of the attraction may not only apply to a physical entrance, but also to a point at which a guest is permitted to experience or participate in the guest attraction. As a non-limiting example, a guest attraction of a rollercoaster ride at an amusement park will be discussed.

Referring back to FIG. 1, an embodiment of the present invention includes a virtual queue 101 into which guests wishing to enjoy the amusement park ride are inserted. The insertion of a guest into the virtual queue may include storing information of the particular guest into a first-in, first-out (FIFO) queue data structure. The information of the guest may include a unique identifier (guest ID) 103 associated with the particular guest. The guest ID 103 may be assigned to the guest upon the guest registering at the venue, assigned to an entrance ticket used by the guest, or otherwise assigned to or received from the particular guest.

In certain embodiments, the unique guest ID 103 may be associated with a personal device of the particular guest, such as a smartphone, smart watch, personal fitness tracker, and the like. In some embodiments, the unique guest ID 103 may be associated with equipment or articles which are issued by the venue and specific to each guest, such as entrance bracelets, necklaces, removable stickers, electronic ink tattoos, and the like. The guest may request entry into a virtual queue for the amusement park ride by scanning the article associated with the guest ID 103 at a terminal associated with the ride, requesting a venue operator to register them into the virtual queue, or submitting a request to a system via the guest's device, such as through an application on a smartphone.

Some embodiments may also allow one guest to represent a group of other guests, where the entire group of guests is represented in the virtual queue 101 by the guest ID 103 of the representative guest. The virtual queue 101 may be configured to include an indicator of the number of guests associated with each guest ID 103 within the virtual queue. Alternatively, the virtual queue 101 may be configured to insert multiple instances of the guest ID 103 with appended variables in numeric order to represent each guest associated with that guest ID. For example, where a guest ID is represented by "guestID", the virtual queue may insert separate instances of guestID_1, guestID_2, and so on to represent each member of the group represented by the representative guest. Thus, the system may allow groups or families to register only once in each virtual queue by one member of the group or family, such as a group leader, supervisor, or parent.

According to a preferred embodiment, once entered into the virtual queue 101, the guest is not required to wait in a physical queue for the attraction and is free to explore or experience other attractions within the venue. According to a preferred embodiment, the system includes a virtual buffer queue 104. As the system processes the queue and allows guests to enter the attraction, the guest's position is eventually moved up to the start of the virtual queue 101. Once the guest ID 103 reaches the start of the virtual queue 101, the guest ID 103 is allowed to dequeue from the virtual queue 101 and enter a virtual buffer queue 104.

The virtual buffer queue 104 corresponds generally to a physical queue 100 located near the attraction, and the virtual buffer queue 104 is configured to include guest information of all guests physically positioned within the physical queue 100. Once a guest is eligible to exit the virtual queue 101 and enter the virtual buffer queue 104, the guest may be instructed to physically enter the physical queue 100 near the attraction and perform an action to register into the virtual buffer queue 104. In some embodiments, a notification may be provided to the guest indicating that the guest is eligible to exit the virtual queue 101 and enter the physical queue 100 and virtual buffer queue 104. Details of the notification system will be discussed in further detail later in this discussion.

The virtual buffer queue 104 may enable the venue to continuously operate the attraction at full capacity by ensuring that enough guests are physically present at the attraction as the attraction processes guests. The venue may preset a desired size of the virtual buffer queue 104 based on various known information of the attraction, including the guest capacity of the attraction for each instance, a total time duration of the attraction for each instance, desired efficiency of the physical queue, desired physical wait time for guests, and the like.

As previously discussed with respect to being inserted into the virtual queue 101, the guest may be removed from the virtual queue 101 and entered into the virtual buffer queue 104 using similar methods. This includes scanning an article associated with the guest ID at a terminal at the entrance of the physical queue, requesting a venue operator to register them into the virtual buffer queue, or submitting a request to a system via the guest's device, such as through an application on a smartphone, and the like. As the guest is dequeued from the virtual queue 101 and inserted into the virtual buffer queue 104, only one action may be required to perform both dequeuing and enqueuing actions. Alternatively, the guest may be queued in the virtual buffer queue 104 before being dequeued from the virtual queue 101.

In alternate embodiments, the system may include sensors which are configured to detect a presence of a guest within the physical queue 100. In such configurations, the guest may be requested to enter the physical queue 100 area, and the sensor may detect the presence of the guest within the area. In response to detecting the presence of the guest within the physical queue 100, the system may remove the guest from the virtual queue 101 and insert the guest into the virtual buffer queue 104 automatically.

In such embodiments, the sensors may incorporate wireless communication techniques to detect and identify a device or tag associated with the particular guest to be removed from the virtual queue 101 and entered into the virtual buffer queue 104. The device or tag may correspond to the devices previously discussed associated with a guest, including smartphones, smart watches, bracelets, necklaces, electronic ink tattoos, and the like. The sensors may be configured to communicate with the devices using wireless communication techniques known and used in the relevant art, including, but not limited to, near field communication (NFC), Bluetooth, radio frequency identification (RFID), and the like.

Once a guest is entered into the virtual buffer queue 104 and the physical queue 100, the guest is processed along with other guests in the physical queue 100 in the order in which they were entered into the physical queue. When a guest reaches the entrance of the attraction at the start of the physical queue 104, the guest is removed from the virtual buffer queue 104 and allowed to enter and enjoy the attraction 102. The venue or an operator of the attraction may preset the desired length or wait time of the virtual buffer queue 104 to a set number of guests or an estimated wait time in order to allow the guests to enjoy the attraction within a reasonable amount of time after entering the physical queue 100.

In some embodiments, each position of the virtual queue 101 may be associated with an estimated wait time to reach the start of the virtual queue. For example, a guest represented by a guest ID 103 at a position n in the virtual queue may be associated with an estimated wait time represented by $E(w_n)$. Where q represents a size of the virtual queue, $q_n$ represents the size of the virtual queue at position n, u represents a total time of each instance of the attraction, and C represents a guest capacity of the attraction for each instance, the estimated wait time may be represented by the following equation:

$$E(w_n) = \frac{q_n * u}{C} \qquad \text{Equation 1}$$

As guests are dequeued from the virtual queue 101 by reaching the start of the virtual queue, or by requesting removal from the virtual queue, the system may continually update the estimated wait time for each position. Alternatively, the system may store estimated wait times for each position within the virtual queue 101 based on previous usage statistics of the attraction and the system.

The estimated wait time may also be affected by delays or malfunctions with the attraction resulting in a period of time where no guests are able to enjoy the attraction. In some embodiments, the system may be configured to insert virtual placeholder guests at a position in the virtual queue to increase the estimated wait time to compensate for the delay or malfunction, by increasing the value of q. The virtual placeholder guests may be represented in the virtual queue by virtual guest ID's which are processed in the same manner as guest ID's representing real guests of the attraction. Therefore, an operator of the venue may intentionally increase the wait time for guests in the virtual queue by adding virtual guest ID's or decrease the wait time by removing virtual guest ID's from the virtual queue. Alternatively, the system may be configured to add a predetermined amount of time for each calculated estimated wait time value based on information input by an operator of the venue.

In some embodiments, the attraction may include more than one virtual queue 101. The virtual queues may each be used for different purposes, and the system may be configured to process the guest ID's of each virtual queue at a different rate or in a different order based on the type of the virtual queue. For example, the attraction may include one standard virtual queue for processing general admission guests, and another VIP virtual queue for processing priority guests, such as those guests who hold special tickets or are a part of a membership program. In this way, the venue may offer incentives to guests to purchases higher priced tickets, join membership programs, and the like. Thus the system may be configured to process the virtual queues in a certain order or at a certain rate, for example, the system may allow two guests from the VIP virtual queue to enter the physical queue for every one guest from the standard virtual queue, and so on. Other embodiments are considered where an attraction may have multiple virtual queues, each with a different priority, processing rate, processing time, and the like. In yet other embodiments, the attraction may also include multiple virtual buffer queues or multiple physical queues to correspond to the multiple virtual queues discussed above.

Figure 2:
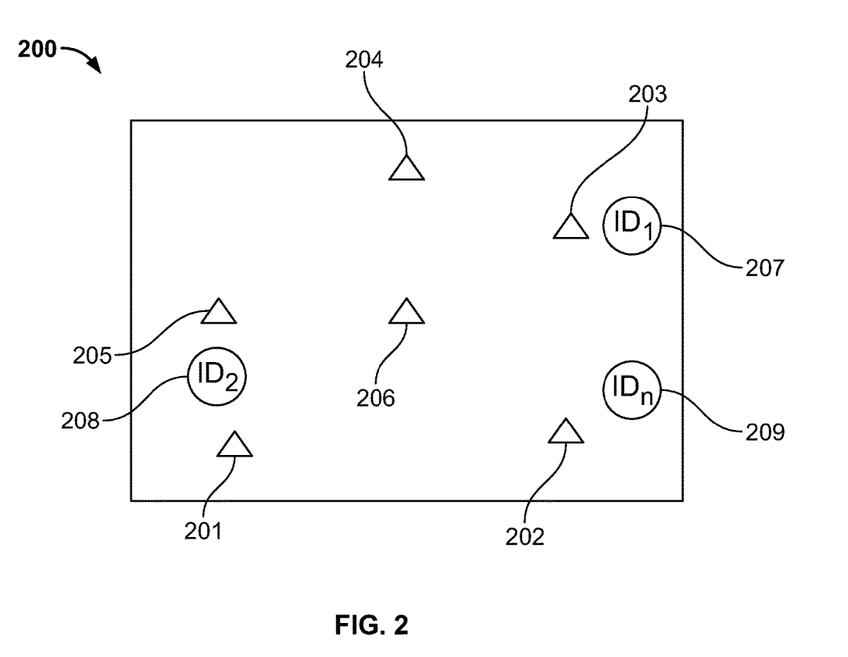
FIG. 2 is an illustration of attractions and guests of a venue related to an embodiment of the present invention.

Turning now to FIG. 2, an illustration of a venue 200 is shown, including guest attractions 201 to 206 located at various positions within the venue. In a system of the present disclosure, each attraction 201 to 206 may implement one or more virtual queues, a virtual buffer queue, and a physical queue as discussed above with respect to FIG. 1. Guests of the venue 207 to 209 may each register in one or more virtual queues of the attractions 201 to 206. As previously discussed, the system may provide a notification to a guest when the guest is eligible to exit the virtual queue and enter the physical queue and register into the virtual buffer queue.

The notification may be provided to a device associated with the guest, such as a smartphone, smart watch, pager, fitness tracker, and the like. In an example, the guest may register into the virtual queue using an application on a smartphone associated with the guest, entering identifying information into a terminal of the system, requesting to be entered into the virtual queue to an operator of the venue, and the like. The system of an embodiment may provide the guest with a notification via an application server to provide a notification to the smartphone of the guest. In other embodiments, the system may provide the notification via other known wireless communication techniques, such as text messaging, wireless network messaging, messaging exchanged via short range communication protocols such as NFC and Bluetooth, telephone and text messaging, and the like. In yet other embodiments, the venue may issue dedicated tracking and messaging devices associated with the venue, and the system may be configured to track the device and transmit information to the device via local communication systems of the venue.

As an example, a guest 209 having an identifier $ID_n$ may be registered in the virtual queue of attraction 201, with a position of n within the virtual queue. When the queue of attraction 201 is processed and guest 209 is eligible to exit the virtual queue and enter the physical queue, the system may provide a notification to guest 209 instructing the guest to come to the location of attraction 201 and enter the physical queue. However, since guest 209 may be located at a position of the venue far away from attraction 201, a travel time of the guest 209 to reach the location of the attraction 201 in order to enter the physical queue may be significant. Travel time of the guest to reach the attraction 201 after receiving a notification may result in delays for processing of the queue for attraction 201, or may result in insufficient guests physically present in the physical queue such that the attraction is not operated at full capacity, such as empty seats on a rollercoaster ride, thereby causing inefficiency.

Figure 3:
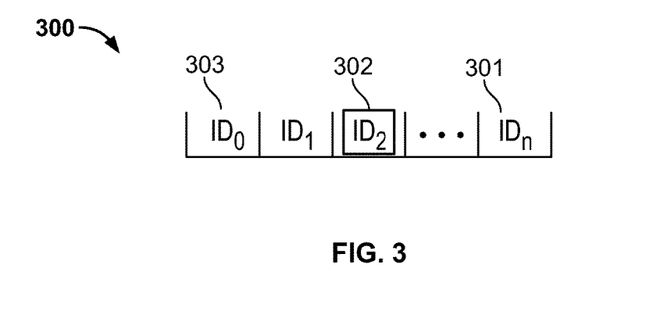
FIG. 3 is an illustration of a virtual queue for a guest attraction of an embodiment of the present invention.

In one embodiment, the system may be configured to provide a notification to the guest 209 when the virtual queue position n of the guest reaches a determined threshold position within the virtual queue to compensate for any estimated lead time required for the notified guest to reach the location of the attraction. FIG. 3 is an illustration of a virtual queue 300 of an embodiment of the present invention wherein a notification position 302 is determined for a guest 301, currently at position n within the virtual queue. As the queue of the attraction is processed, the position of the guest 301 may approach the starting position 303 within the virtual queue. As previously discussed, position n within the virtual queue may be associated with an estimated wait time to reach the starting position 303 of the virtual queue 300. Based on the estimated wait time value, the system may be configured to determine a position p 302 for notifying the guest 301 that the guest should come to the attraction to enter the physical queue and virtual buffer queue, as previously discussed.

In some embodiments, the system may be configured to determine the notification position p within the virtual queue based on a current location of the guest 301 relative to the location of the attraction. Referring back to FIG. 2, the system may comprise location sensors positioned at various locations within the venue configured to detect a presence of a guest and communicate the presence information to the system. The location sensors may be similar to those previously discussed with respect to the sensors configured to detect a presence of a guest in the physical queue of an attraction.

The location sensors may incorporate wireless communication techniques to detect and identify a device or tag associated with a guest as the guest comes within a threshold distance of the location sensor. The device or tag of the guest may correspond to the devices previously discussed associated with a guest, including smartphones, smart watches, bracelets, necklaces, electronic ink tattoos, and the like. The location sensors may be configured to communicate with the devices using wireless communication techniques known and used in the relevant art, including, but not limited to, GPS, WiFi, near field communication (NFC), Bluetooth, Bluetooth low energy (BLE) proximity sensing, radio frequency identification (RFID), and the like. The location sensors may be placed at high traffic locations throughout the venue where the guest is likely to travel in order to reach desirable attractions within the venue, or the location sensors may be placed all around the venue such that all guests and location of guests within the venue can be detected and identified.

For example, location sensors may be placed at the entrance or exit of the venue, along walkways between popular attractions, near food and drink vendors, near bathroom locations, in elevators or near escalators, parking lots, and the like. In alternative embodiments, interactive elements of the venue may also be implemented to collect identifying information of a guest which may be used to determine a location of the guest within the venue.

For example, a photo booth machine or vending machine within an amusement park may be configured to receive information directly from the guest such as guest ID, ticket ID number, credit card number, cell phone number, and the like, and the received information may be used to report the presence of the guest at the associated location. Alternatively, a guest may be requested to provide identifying information directly to an operator of the venue which may be used to provide location detection information of the guest; and examples may include food or drink purchasing locations or equipment purchase or rental locations within the venue.

Referring back to the illustration of the venue of FIG. 2, the system may receive location information of various guests 207-209 within the venue from location sensors placed around the venue as discussed above. In processing the virtual queue of attraction 201, the system may obtain the location information of various guests placed within the virtual queue in order to determine a notification position at which the guest is to be notified to come to the physical queue.

For example, referring also to FIG. 2, the system may obtain location information of guest 209 who is currently in position n within virtual queue 300 of FIG. 3, represented by the guest ID 301 of FIG. 3. The location information of guest 209 may indicate that the guest is located far away from attraction 201 and an estimated travel time for the guest 209 to reach attraction 201 may be determined. The system may be configured to dynamically determine the estimated travel time of the guest 209 to reach the attraction 201 based on the distance, updated information related to the condition of the venue, number of guests within the venue, weather, personal information known about the particular guest 209, and the like. Alternatively, the system may be configured to retrieve the estimated travel time from a database storing estimated travel times between various locations within the venue.

In yet other embodiments, the system may also be configured to modify the estimated travel time of the guest based on a predicted current activity or status of the detected guest. For example referring to FIG. 2, if a detected current location of a guest 207 is a food court 203 of the venue, the system may predict that that the guest is purchasing or enjoying food, which the guest would have to complete before traveling toward the attraction 201. Thus, the system may add a predicted time length to the estimated travel time to account for the current predicted activity of the guest 207. In some embodiments, the system may store previously detected activity history of various guests associated with various locations to compile average time estimates for various locations, activities, and the like, in order to modify the estimated travel times for guests based on their current location and activity.

In addition to a current location or activity of a guest within the venue, the notification position of the guest may also be affected by other guests within the virtual queue of an attraction who are removed from the virtual queue without entering the attraction. For example, a guest currently queued in the virtual queue of an attraction may decide that he or she no longer wishes to experience the attraction, or may wish to reenter the virtual queue for the attraction at a later time or following other activities within the venue. Thus, an estimated wait time associated with the position of the guest in the virtual queue may consider an approximated number of guests who will be removed from the virtual queue without entering the virtual buffer queue or the physical queue.

Similarly, an estimated wait time associated with the virtual buffer queue may consider an approximated number of guests who will be removed from the virtual buffer queue without entering the attraction. The approximated numbers of guests to leave the queues may be based on historical averages and previous metrics collected of guests leaving queues for that particular attraction, and some embodiments may further take into account various factors including time of day, weather, day of the week, day of the year, and the like.

A guest may request to be removed from a virtual queue or a virtual buffer queue by methods similar to those discussed for entering a queue, such as scanning the article associated with the guest ID at an exit terminal, requesting a venue operator to remove them from the queue, or submitting a request to a system via the guest's device, such as through an application on a smartphone.

Based on the estimated travel time for a currently detected location of guest 209, the system may determine the position p at which to provide a notification to the user to come enter the physical queue and the virtual buffer queue. In some preferred embodiments, the system may determine the position p such that after providing notification to the guest, the guest will arrive to enter the physical queue as the guest's position n approaches or is at the start of the virtual queue. This determination may also take into consideration other factors such as a number of guests who have dequeued or been otherwise removed from the queue ahead of the guest's position n. Thus, an embodiment of the system may determine a notification position p for providing a notification to guest 209 in position n by the following equation:

$$p_n = \frac{E(w_b) + E(l_n)}{u} - E(d_{v,n}) - E(d_{b,n}) \qquad \text{Equation 2}$$

Wherein $E(w_b)$ represents an estimated wait time value for the virtual buffer queue (corresponding to the wait time of the physical queue), $E(l_n)$ represents an estimated travel time based on the detected location of the guest, u represents a total time of each instance of the attraction, $E(d_{v,n})$ represents an estimated number of guests that will exit the virtual queue ahead of position n and not enter the virtual buffer queue (for example guests who no longer wish to enter the attraction), and $E(d_{b,n})$ represents an estimated number of guests that will exit the virtual buffer queue ahead of position n and not enter the attraction (for example guests who no longer wish to enter the attraction). In such an embodiment, the notification position may be determined, and when guest 301 reaches position p, the system may provide the guest with a notification to come to the attraction and enter the physical and virtual buffer queues in order to maximize efficiency of the attraction and ensure full capacity during all times of operation.

In some embodiments, after notifying a guest that they should come enter the physical queue, the system may set a time window during which the notified guest may show up at the attraction to enter the physical queue and the virtual buffer queue. Once the time window is closed, the guest may no longer be able to enter the physical queue, lose the guest's place in the queue, and need to re-enter the queue system for the attraction. However, in other embodiments, the guest may be allowed to enter the physical queue any time after receiving a notification. Alternatively, a venue may vary or switch between these configurations depending on varying conditions of the venue, such as the number of total guests within the park, number of attractions which are unavailable due to malfunction or maintenance, and the like.

For example, if a venue determines that all attractions are available and thus the guests of the venue are spread out evenly among the attractions, the venue may change a setting to allow a guest to enter a physical queue at any point after receiving a notification, or alternatively within a reasonably lengthy time window. On the other hand, if the venue determines that multiple attractions are unavailable and thus the remaining attractions will be processing an unusually high number of guests, the venue may require that the guests show up and enter the physical queue within a strict time window after receiving a notification in order to maximize efficiency and capacity of the attraction.

Embodiments of the system may be configured to continuously determine the notification position for all guests within the virtual queue, or at certain preset intervals of time. Other embodiments may be configured to update the determined position for all guests only in response to certain events at the virtual queue, such as dequeue of a guest, intake of guests into the attraction, insertion of additional guests, and the like.

In some embodiments of the present disclosure, the system may manage the queue for a particular attraction at a venue by obtaining and incorporating information related to other attractions within the same venue. When determining a notification position of a guest, the system may check the queues of other attractions to determine whether the guest is already in a physical queue for another attraction. Additionally, other embodiments of the system may check other queue information in addition to the current location of the guest with respect to another attraction for which the guest is in a queue.

Figure 4:
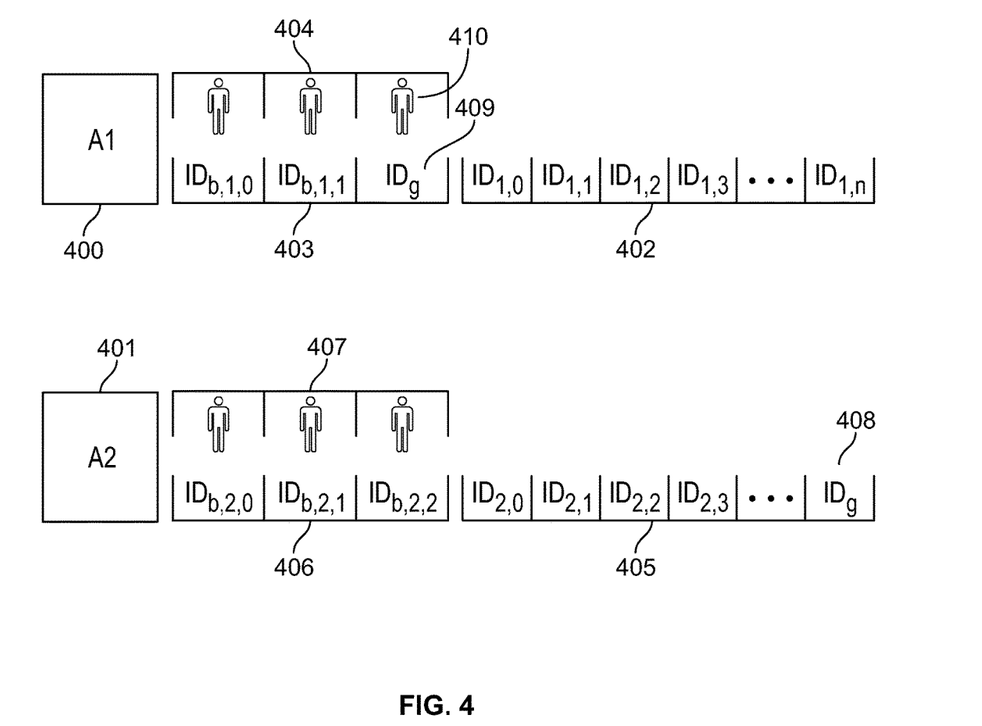
FIG. 4 is an illustration of a physical queue, virtual buffer queue, and virtual queue for two guest attractions according to an embodiment of the present invention.

As an example, FIG. 4 shows a diagram of two attractions of a venue with guests in a queue for the corresponding attraction. FIG. 4 also includes queues of each attraction according to embodiments of the present disclosure including a virtual queue 402, virtual buffer queue 403, and physical queue 404 of attraction 1 (A1) 400, and a virtual queue 405, virtual buffer queue 406, and physical queue 407 of attraction 2 (A2) 401. As previously discussed, the virtual queue of A2 may determine an estimated wait time associated with each position of the virtual queue, and additionally may determine a notification position for each guest to notify the guest when the guest should come to enter the physical queue for attraction A2.

The system may be configured to be implemented at a venue with multiple attractions each having a queue system according to the present disclosure. In the example of FIG. 4, an embodiment of the system may be implemented for each attraction, however other embodiments are considered wherein a single system may be implemented for an entire venue to manage and minimize physical queues for all attractions at a venue. In the example of FIG. 4, a system for A1 400 may communicate with a system for A2 401 via a network, such as the internet or an intranet of the venue. Various hardware components, including server computers, network computers, and communication interface hardware may be provided to provide communication between various systems and portions thereof.

With continued reference to FIG. 4, a guest ID 408 (represented by $ID_g$) may be registered in the virtual queue 405 for A2 401. When the system of A2 determines notification positions of each of the guests in the virtual queue 405, the system of A2 may obtain information related to other attractions of the venue, including the guests associated with a queue of attraction A1. The information may be obtained in a communication directly from A1, or may be provided by a central database server which collects and stores information from a system of each attraction. The obtained information may include all guest ID's that are currently queued for A1, including the physical queue 404, virtual buffer queue 403, and virtual queue 402, in addition to the position of each guest within the corresponding queue.

The system of A2 may be configured to receive the information from A1 and determine that the guest associated with guest ID 408 of virtual queue 405 is currently queued in the virtual buffer queue 403 of A1 at position 409. Alternatively, the system may also determine that the guest associated with guest ID 408 is in the physical queue 403 of A1 by obtaining location information of the guest 410. When it is determined that the guest associated with guest ID 408 is queued in the virtual buffer queue of another attraction, the system may set the notification position of guest ID 408 such that the notification is to be sent at a later time in order to provide the guest with maximum time to enjoy attraction A1, avoid the guest leaving the physical queue for A1 to enter the physical queue for A2, or avoid having the guest feeling rushed during the enjoyment of the A1 attraction.

Thus, when it is determined that the guest associated with guest ID 408 is currently queued in a virtual buffer queue for another attraction A1, the system may be configured to temporarily set the notification position of the guest ID 408 to a lower position (corresponding to a later notification time), such as by setting the notification position to zero. Upon the next occurrence of the notification position update, the system may check again to see if the guest associated with guest ID 408 is still in the virtual buffer queue 403 or physical queue 404 of A1, and if not, the notification position may be changed from zero to a determined notification position based on various obtained information, as previously discussed above.

In another embodiment, the system may be configured to set a flag or a setting associated with the guest indicating that the guest should not be notified until the guest has completed experiencing A1. The flag may be set in a database specific to the virtual queue 405 of A2, or may be set in a central guest database record associated with the particular guest associated with guest ID 408. The guest database may be coupled to a central database server accessible to the queue system for each attraction. Thus, A2 may set a flag for the guest database record that the guest is currently in a physical queue or is currently experiencing an attraction, such as a "notification unavailable" flag. Other queue systems for other attractions may query the guest database record and receive an indication that the guest is currently in a physical queue or is experiencing an attraction, and to delay any notifications accordingly.

Further, in yet other embodiments, the queue system of an attraction may be configured to set the "notification unavailable" type flag in the guest database when the guest checks into the physical queue of that attraction by exiting the virtual queue and entering the virtual buffer queue. The flag for the particular guest may be accessible by other systems of other attractions to receive an indication that the guest should not be notified. In some embodiments, guests may then be "checked-in" to an attraction once the guest reaches the front of the physical queue and actually enters the attraction, and correspondingly "checked-out" of an attraction when the guest completes the experience and exits the attraction. The check-in and check-out may be obtained via the various methods and protocols previously discussed herein regarding entering or exiting queues, or detecting presence of guests, including scanning the article associated with the guest ID at an exit terminal, requesting a venue operator to remove them from the attraction, or submitting a request to a system via the guest's device, such as through an application on a smartphone. Once a guest has been checked-out of an attraction, the system may be configured to remove the "notification unavailable" flag from the guest database record so that other attractions may resume determining an appropriate notification position for the corresponding virtual queue, or sending notifications to the guest.

In some embodiments, the venue may also prevent a guest from entering an attraction immediately after experiencing and exiting another attraction of the venue. This may be to prevent log jams at venues, and also to encourage guests to experience the non-attraction related facilities at a venue, such as shops, restaurants, and the like. An operator of the venue may set a minimum delay time between venues for a particular guest. In some embodiments, while the guest may register for multiple virtual queues within the venue, the system of an attraction may not send a notification to a particular guest if the guest has recently exited another attraction. In these embodiments, the "notification lock" implementation may be used to indicate to a system that a particular guest should not be notified. In other embodiments, each attraction may have different minimum delay times, and thus the system of an attraction may obtain information of a guest's activity history, such information of the last time the guest exited an attraction, and determine whether the guest can be notified based on a preset minimum delay time set by an operator of the attraction.

Thus in an embodiment, for an attraction $a_0$ at a venue having multiple attractions including $a_0$ and $a_1$, the notification position $p_{a_0,n}$ of a guest at position n may be determined by the following equation:

$$\frac{E(w_{a_0,b}) + E(l_{a_0,n}) + t}{u_0} - E(d_{a_0,v,n}) - E(d_{a_0,b,n}) \quad \text{Equation 3}$$

Wherein $E(w_{a_0,b})$ represents an estimated wait time value for the virtual buffer queue of a0 (corresponding to the wait time of the physical queue of a0), $E(l_{a_0,n})$ represents an estimated travel time to a0 based on the detected location of the guest, t represents a minimum delay time between attractions as set by the venue operator, $u_0$ represents a total time of each instance of attraction a0, $E(d_{a_0,v,n})$ represents an estimated number of guests that will exit the virtual queue of attraction a0 ahead of position n and not enter the virtual buffer queue (for example guests who no longer wish to enter the attraction), and $E(d_{a_0,b,n})$ represents an estimated number of guests that will exit the virtual buffer queue of attraction a0 ahead of position n and not enter the attraction (for example guests who no longer wish to enter the attraction). While an embodiment is disclosed as implementing the above equations, it will be understood by those of ordinary skill in the art that variations and combinations thereof may be present in various embodiments of the system to achieve the methods and functions discussed herein.

Figure 5:
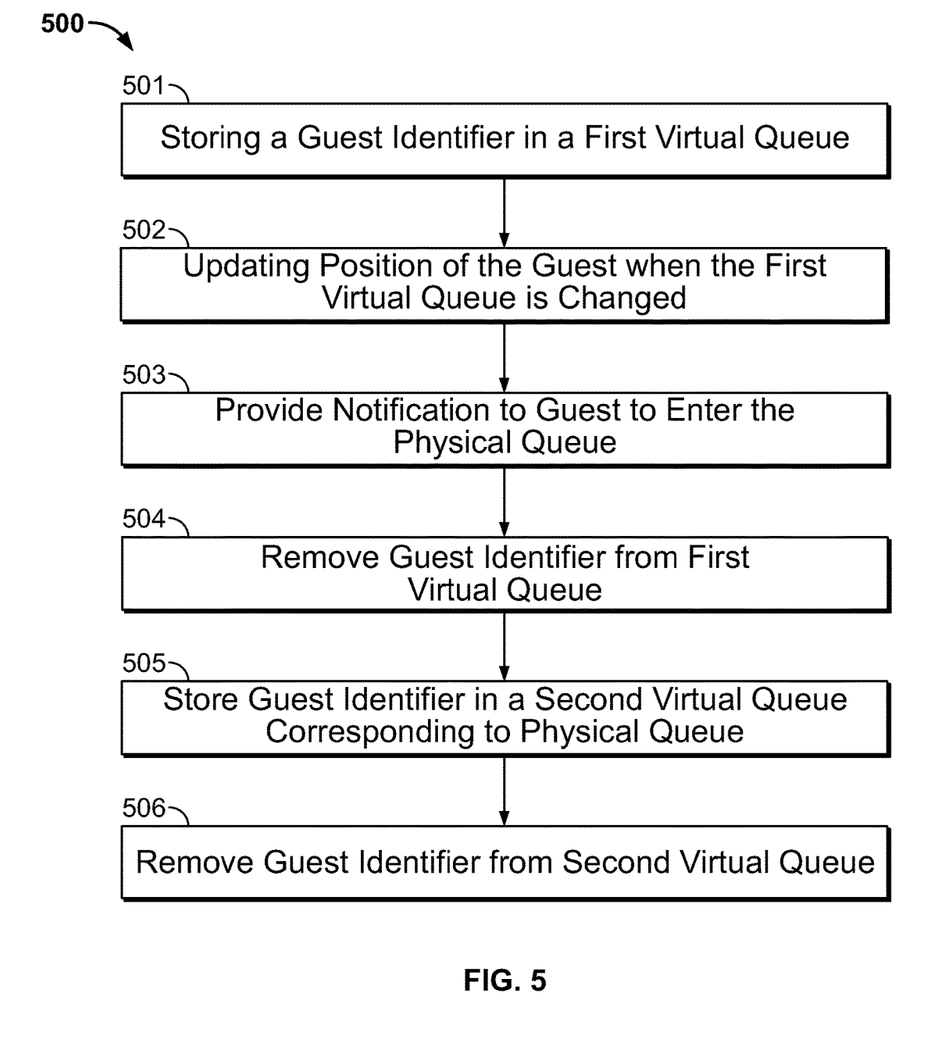
FIG. 5 is a flowchart illustration of a method of an embodiment of the present invention.

FIG. 5 is a flowchart illustration of a method according to an embodiment of the present disclosure. The method 500 of the embodiment includes storing a guest identifier at block 501, the guest identifier corresponding to a guest in a first virtual queue, wherein a position of the guest within the first virtual queue is associated with an estimated wait time for the first guest attraction. The method further includes updating the position of the guest when the first virtual queue is changed 502, providing a notification to the guest to enter the physical queue 503 when the position of the guest in the first virtual queue is less than or equal to a threshold position of the first virtual queue, removing the guest identifier from the first virtual queue 504 in response to an indication to dequeue the guest from the first virtual queue, and storing the guest identifier in a second virtual queue corresponding to the physical queue 505. Finally, the method may further include removing the guest identifier from the second virtual queue in response to an indication that the guest is exiting the physical queue 506.

According to embodiments of the present invention, a queue managing system of a guest attraction may include a virtual queue, a virtual buffer queue, and a physical queue for minimizing the physical queue of the attraction. The system and methods may include maintaining a queue by storing information of a guest in the virtual queue of the attraction and providing a notification when the guest is eligible for exiting the virtual queue and entering the virtual buffer queue and the physical queue. Embodiments of the system may further be configured to obtain information of other attractions and basing the determination of a notification position of a guest on queue information of other attractions.

Various embodiments described herein may be implemented in a computer-readable non-transitory medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

The various devices, modules, terminals, and the like discussed herein may be implemented on a computer by execution of software comprising machine instructions read from computer-readable non-transitory medium. These hardware aspects may further include an input/output interface, graphical user interface, or other input/output means to allow the input/output of information related to controlling functions, inputting information, outputting information, receiving information, or transmitting information. The hardware aspects may further include circuitry, wired and wireless networking hardware, and hardware connectivity configurations to enable to various computers, processors, memory, interfaces, and the like to communicate, transmit, receive, and otherwise exchange information with each other, and with external or third party sources, such as the Internet. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for minimizing a physical queue for a first guest attraction, the method comprising:
storing a guest identifier corresponding to a guest in a first virtual queue, wherein a position of the guest within the first virtual queue is associated with a first estimated wait time for the first guest attraction;
updating the position of the guest when the first virtual queue is changed;
providing a notification to a terminal associated with the guest for the guest to enter the physical queue when the position of the guest in the first virtual queue is less than or equal to a threshold position of the first virtual queue, wherein when a notification lock indicator is set for the guest identifier, the notification is delayed until the notification lock indicator expires;
removing the guest identifier from the first virtual queue and storing the guest identifier in a second virtual queue in response to an indication that the guest is physically present at the first guest attraction, wherein a specific position of the stored guest identifier in the second virtual queue corresponds to a specific position of the guest in the physical queue and the specific position of the stored guest identifier in the second virtual queue is associated with a second estimated wait time for the first guest attraction; and
removing the guest identifier from the second virtual queue in response to an indication that the guest is exiting the physical queue,
wherein the notification lock indicator is set when a guest completes a guest attraction and expires after a preset minimum delay time between attractions.

2. The method of claim 1, wherein the threshold position is determined based on a threshold estimated wait time.

3. The method of claim 2, wherein the threshold position is updated at preset intervals of time.

4. The method of claim 1, further comprising:
obtaining physical location information of the guest;
determining a travel time of the guest to the physical queue based on the obtained physical location information; and
adjusting the threshold position based on the determined travel time.

5. The method of claim 4, wherein the physical information of the guest is obtained from at least one sensor configured to detect a presence of the terminal associated with the guest.

6. The method of claim 1, wherein:
the first virtual queue comprises a plurality of identifiers each corresponding to one of a plurality of guests; and
the first virtual queue is updated when a guest of the plurality of guests is dequeued from the first virtual queue or in response to a request to remove a guest of the plurality of guests from the first virtual queue.

7. The method of claim 1, further comprising storing a placeholder identifier not associated with any guest in the first virtual queue inserted in a position ahead of the position of the guest to increase the first estimated wait time to reflect a delay at the first guest attraction.

8. The method of claim 1, further comprising:
obtaining second guest attraction information comprising a position of the guest within a queue for a second guest attraction; and
adjusting the threshold position based on the obtained second guest attraction information.

9. The method of claim 1, further comprising:
obtaining second guest attraction information comprising a position of the guest within a queue for a second guest attraction; and
delaying the notification to the guest based on the obtained second guest attraction information.

10. The method of claim 1, further comprising storing information in a database associated with the first guest attraction, wherein the stored information is related to time the guest was in the first and second virtual queues.

11. The method of claim 1, further comprising storing guest information in a database, wherein the guest information is related to attraction activities of the guest.

12. The method of claim 1, further comprising transmitting the notification to a terminal associated with the guest via a wireless communication interface.

13. The method of claim 1, wherein the notification lock indicator corresponds to an elapsed time since the guest exited another guest attraction and expires when the elapsed time reaches the preset minimum delay time.

14. A system for minimizing a physical queue for a first guest attraction, the system comprising:
a memory configured to store information;
a communication interface configured to transmit and receive information; and
a controller configured to:
cause the memory to store a guest identifier corresponding to a guest in a first virtual queue, wherein a position of the guest within the first virtual queue is associated with a first estimated wait time for the first guest attraction;

update the position of the guest when the first virtual queue is changed;

cause the communication interface to transmit a notification to a terminal associated with the guest for the guest to enter the physical queue when the position of the guest in the first virtual queue is less than or equal to a threshold position of the first virtual queue, wherein when a notification lock indicator is set for the guest identifier, the notification is delayed until the notification lock indicator expires;

cause the memory to remove the guest identifier from the first virtual queue and store the guest identifier in a second virtual queue in response to an indication that the guest is physically present at the first guest attraction, wherein a specific position of the stored guest identifier in the second virtual queue corresponds to a specific position of the guest in the physical queue and the specific position of the stored guest identifier in the second virtual queue is associated with a second estimated wait time for the first guest attraction; and cause the memory to remove the guest identifier from the second virtual queue in response to an indication that the guest is exiting the physical queue, wherein the notification lock indicator is set when a guest completes a guest attraction and expires after a preset minimum delay time between attractions.

15. The system of claim 14, wherein the threshold position is determined based on a threshold estimated wait time.

16. The system of claim 15, wherein the threshold position is updated at preset intervals of time.

17. The system of claim 15, wherein the threshold position is updated in response to a change of the position of the guest.

18. The system of claim 15, wherein the controller is further configured to:

obtain physical location information of the guest;

determine a travel time of the guest to the physical queue based on the obtained physical location information; and adjust the threshold position based on the determined travel time.

19. The system of claim 18, wherein the physical information of the guest is obtained from at least one sensor configured to detect a presence of the terminal associated with the guest.

20. The system of claim 14, wherein:

the first virtual queue comprises a plurality of identifiers each corresponding to one of a plurality of guests; and the controller is further configured to update the first virtual queue when a guest of the plurality of guests is dequeued from the first virtual queue or in response to a request to remove a guest of the plurality of guests from the first virtual queue.

21. The system of claim 14, wherein the controller is further configured to:

cause the memory to store a placeholder identifier not associated with any guest in the first virtual queue inserted in a position ahead of the position of the guest to increase the first estimated wait time to reflect a delay at the first guest attraction.

22. The system of claim 14, wherein the controller is further configured to:

obtain second guest attraction information comprising a position of the guest within a queue for a second guest attraction; and adjust the threshold position based on the obtained second guest attraction information.

23. The system of claim 14, wherein the controller is further configured to:

obtain second guest attraction information comprising a position of the guest within a queue for a second guest attraction; and delay the notification to the guest to enter the physical queue based on the obtained second guest attraction information.

24. The system of claim 14, wherein the controller is further configured to:

cause the memory to store information in a database associated with the first guest attraction, wherein the stored information comprises a length of time the guest was in the first virtual queue or a length of time the guest was in the second virtual queue.

25. The system of claim 14, wherein the controller is further configured to cause the memory to store guest information comprising information related to actions of the guest with respect to the first guest attraction.

26. The system of claim 14, wherein the notification lock indicator corresponds to an elapsed time since the guest exited another guest attraction and expires when the elapsed time reaches the preset minimum delay time.

27. A machine-readable non-transitory medium having stored thereon machine-executable instructions for:

storing a guest identifier corresponding to a guest in a first virtual queue, wherein a position of the guest within the first virtual queue is associated with a first estimated wait time for the first guest attraction;

updating the position of the guest when the first virtual queue is changed;

providing a notification to a terminal associated with the guest for the guest to enter the physical queue when the position of the guest in the first virtual queue is less than or equal to a threshold position of the first virtual queue, wherein when a notification lock indicator is set for the guest identifier, the notification is delayed until the notification lock indicator expires;

removing the guest identifier from the first virtual queue and storing the guesting identifier in a second virtual queue in response to an indication that the guest is physically present at the first guest attraction, wherein a specific position of the stored guest identifier in the second virtual queue corresponds to a specific position of the guest in the physical queue and the specific position of the stored guest identifier in the second virtual queue is associated with a second estimated wait time for the first guest attraction; and removing the guest identifier from the second virtual queue in response to an indication that the guest is exiting in the physical queue, wherein the notification lock indicator is set when a guest completes a guest attraction and expires after a preset minimum delay time between attractions.

28. The machine-readable non-transitory medium of claim 27, wherein the threshold position corresponds to a threshold estimated wait time.

29. The machine-readable non-transitory medium of claim 28 further having stored thereon machine-executable instructions for:

obtaining physical location information of the guest;

determining a travel time of the guest to the physical queue based on the obtained physical location information; and adjusting the threshold position based on the determined travel time.

30. The machine-readable non-transitory medium of claim 27 further having stored thereon machine-executable instructions for:
  obtaining second guest attraction information comprising a position of the guest within a queue for a second guest attraction; and
  adjusting the threshold position based on the obtained second guest attraction information.

31. The machine-readable non-transitory medium of claim 27, wherein the notification lock indicator corresponds to an elapsed time since the guest exited another guest attraction and expires when the elapsed time reaches the preset minimum delay time.

\* \* \* \* \*